United States Patent
Gilra

(10) Patent No.: US 9,886,747 B2
(45) Date of Patent: *Feb. 6, 2018

(54) DIGITAL IMAGE BLEMISH REMOVAL

(71) Applicant: Adobe Systems Incorporated, San Jose, CA (US)

(72) Inventor: Anant Gilra, Sunnyvale, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/375,525

(22) Filed: Dec. 12, 2016

(65) Prior Publication Data

US 2017/0103502 A1    Apr. 13, 2017

Related U.S. Application Data

(63) Continuation of application No. 14/877,238, filed on Oct. 7, 2015, now Pat. No. 9,552,626.

(51) Int. Cl.
*G06K 9/40* (2006.01)
*G06T 5/00* (2006.01)

(52) U.S. Cl.
CPC .... *G06T 5/005* (2013.01); *G06T 2207/10004* (2013.01)

(58) Field of Classification Search
CPC .......... G06T 5/00; G06T 5/001; G06T 5/002; G06T 5/003; G06T 5/005; G06T 5/008; G06T 7/0002; G06T 7/11; G06T 7/162; G06T 7/194; G06T 11/40; G06T 11/60; G06T 11/80; G06T 19/20;
(Continued)

(56) References Cited

U.S. PATENT DOCUMENTS 8,385,681 B2 * 2/2013 Weiss ............ G06T 5/005
345/594
8,761,542 B2 * 6/2014 Weiss ............ G06T 5/005
382/162

(Continued)

OTHER PUBLICATIONS

Barnes et al., "PatchMatch: A Randomized Correspondence Algorithm for Structural Image Editing," ACM Transactions on Graphics (Proc. SIGGRAPH) 28(3), Aug. 2009.

*Primary Examiner* — Jose Couso
(74) *Attorney, Agent, or Firm* — Finch & Maloney PLLC

(57) ABSTRACT

Techniques are disclosed for removing blemishes from a digital image by detecting pixels containing the blemishes and replacing or blending those pixels with other pixels in the image that have a relatively low probability of containing a blemish. A standard pixel mask includes a user-selected region of the image; an extended mask extends beyond the user-selected region; and a minimal output pixel mask corresponds to the user-selected region. The minimal mask increases the transparency of some regions in the standard mask while maintaining the opacity of the standard mask in the blemish areas. Colors in the extended mask are weighted and clustered, and pixels in the minimal mask are assigned varying shades of transparency as a function of the color frequency. A blemish removal algorithm is applied using the minimal mask, with semi-transparent regions receiving a blend of source and patch pixel colors according to the level of transparency.

17 Claims, 21 Drawing Sheets
(18 of 21 Drawing Sheet(s) Filed in Color)

(58) Field of Classification Search
CPC . G06T 2207/10144; G06T 2207/20004; G06T 2207/20012; G06T 2207/20092; G06T 2207/20104; G06T 2207/20172; G06T 2207/20182; G06T 2207/20192; G06T 2207/20201; G06T 2219/20; G06T 2219/2012; G06K 9/00; G06K 9/033; G06K 9/44; G06K 9/4604; G06K 9/4642; G06K 9/4652; G06K 9/56; G06K 9/6202; G06K 9/6203; G06K 9/6212; G06K 15/1223; G06K 15/1847; G06K 15/1851; G06K 15/1872; G06K 2009/6213; G06F 3/04842; G06F 3/04845; G06F 17/30843; H04N 1/00167; H04N 1/409; H04N 1/4092; H04N 1/4097; H04N 1/58; H04N 5/2355; H04N 9/646; H04N 21/4318; H04N 21/47205

See application file for complete search history.

(56) References Cited

U.S. PATENT DOCUMENTS

| | | | |
|---|---|---|---|
| 8,798,373 B2 * | 8/2014 | Shibata | G06T 5/005 382/195 |
| 9,041,727 B2 * | 5/2015 | Ubillos | G06F 3/0484 345/594 |
| 9,317,773 B2 | 4/2016 | Shechtman et al. | |
| 9,552,626 B1 * | 1/2017 | Gilra | G06T 5/001 |
| 9,691,136 B2 * | 6/2017 | Florea | G06K 9/00221 |
| 2014/0301643 A1 * | 10/2014 | Weiss | G06T 5/005 382/167 |
| 2016/0078634 A1 | 3/2016 | Wang et al. | |
| 2017/0032497 A1 * | 2/2017 | Sarma | G06T 3/40 |
| 2017/0048442 A1 * | 2/2017 | Cote | G06T 5/50 |
| 2017/0076142 A1 * | 3/2017 | Chang | G06K 9/00281 |

* cited by examiner

Standard, Extended and Background Pixel Masks

Minimal Output Pixel Mask

Standard Pixel Mask

Source Image

Destination Image

Minimal Output Pixel Mask

Destination Image

Minimal Output Pixel Mask

Destination Image

Minimal Output Pixel Mask

Source Image

Standard Pixel Mask

Minimal Output Pixel Mask

Destination Image

Source Image

Standard Pixel Mask

Minimal Output Pixel Mask

Destination Image

Source Image

Standard Pixel Mask

Minimal Output Pixel Mask

Destination Image

Source Image

Standard Pixel Mask

Minimal Output Pixel Mask

Destination Image

Source Image

Standard Pixel Mask

Minimal Output Pixel Mask

Destination Image

Source Image

Standard Pixel Mask

Minimal Output Pixel Mask

Destination Image

DIGITAL IMAGE BLEMISH REMOVAL

CROSS-REFERENCE TO RELATED APPLICATIONS

This patent application is a continuation of U.S. application Ser. No. 14/877,238, filed Oct. 7, 2015, and entitled "DIGITAL IMAGE BLEMISH REMOVAL," which is incorporated herein by reference in its entirety.

FIELD OF THE DISCLOSURE

This disclosure relates generally to the field of data processing, and more particularly, to techniques for removing blemishes from digital images.

BACKGROUND

Digital image editing tools can be used to remove unwanted features from images. For instance, using some existing techniques, certain pixels containing a blemish are regenerated based on colors of nearby pixels by blurring or smoothing (e.g., using Gaussian filters), or infilling (e.g., using patch-based pixel replacement algorithms), which have the effect of diminishing or removing the blemish. Some techniques also apply a high-frequency component from another image to a healed region after it has been modified to replace defective pixel colors. Yet the results of such techniques often result in undesirable visible effects. For instance, some techniques produce visible discontinuities at the edges of the regenerated pixels or result in a loss of detail. These areas are easily noticed, especially when the surrounding areas are unevenly textured, or when pixel intensity changes sharply at the boundary. Another existing blemish removal technique involves altering the lighting or other attributes of the image, such as color or contrast, to make the blemish less visible. However, this technique may be unsatisfactory if the blemish remains visible, or if the changes adversely affect other portions of the image. Therefore, improved blemish removal techniques are desirable.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fee.

The accompanying drawings are not intended to be drawn to scale. In the drawings, each identical or nearly identical component that is illustrated in various figures is represented by a like numeral.

DETAILED DESCRIPTION

Figure 1:
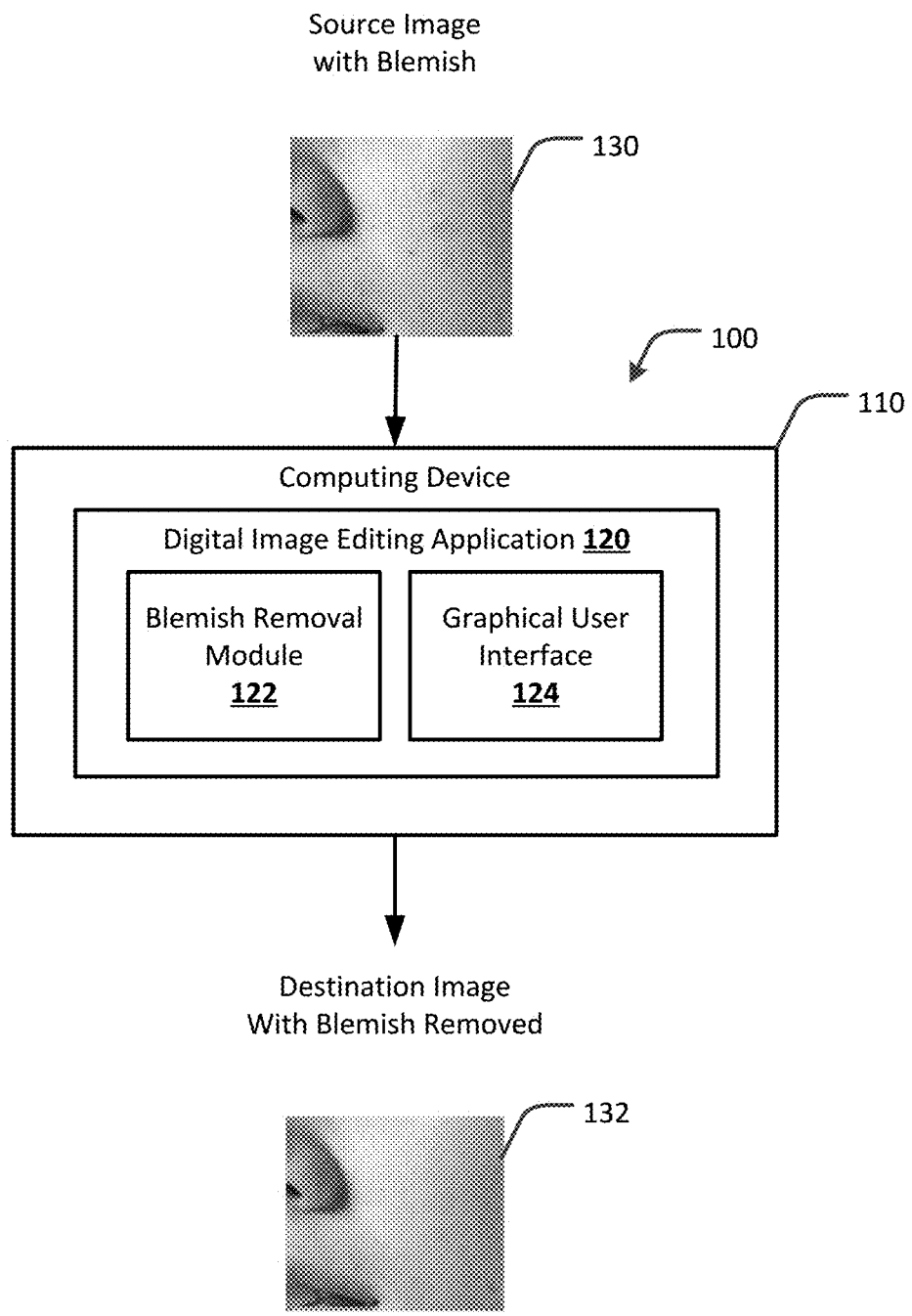
FIG. 1 shows an example digital image editing system, in accordance with an embodiment of the present disclosure.

Some existing blemish removal techniques suffer from a number of shortcomings. For instance, techniques that operate on the image globally can alter the appearance and lighting of regions that do not include the blemish, leading to unrealistic looking results. Furthermore, local lighting effects are affected and not preserved. Other techniques that are adapted for operating on small image regions suffer from performance degradation when operating on larger regions. Some existing content fill aware techniques may undesirably replace one blemish region with another blemish region. Some other blemish removal techniques do not accurately replicate the texture of the region being modified, which can be visually apparent. Yet other techniques depend on the precision with which the user selects the pixels to be altered, and therefore the results can vary if the selection is imprecise.

To this end, and in accordance with an embodiment of the present disclosure, techniques are disclosed for removing blemishes from a digital image by locally detecting pixels within a user-selected region of the image containing the blemishes, and replacing or blending those pixels with other pixels in the image that have a relatively low probability of containing a blemish. To achieve blemish removal, three pixel masks are generated with respect to the user-selected region of the image: a standard pixel mask that includes the user-selected region, an extended pixel mask that extends beyond the user-selected region, and a minimal output pixel mask that corresponds to the user-selected region (the same region as the standard pixel mask) and through which a blemish removal algorithm is applied. Each of these pixel masks defines the transparency or, conversely, the opacity of the corresponding source image pixels to the blemish removal algorithm. The standard and extended pixel masks result from a user selection of one or more pixels in the image, and the minimal output pixel mask is automatically generated based on the standard and extended pixel masks. Generally, low transparency values in the minimal output pixel mask correspond to regions where a blemish is to be removed by replacing pixel colors, while high transparency values correspond to non-blemish regions where the colors should not be altered. The minimal output pixel mask is configured to increase the transparency of some regions of the standard mask while maintaining the opacity of pixels in the blemish areas, thereby minimizing the opaque regions to regions most likely to contain the blemish. As such, using the minimal output pixel mask, the blemish removal algorithm will replace the colors of low transparency pixels (blemish areas) with different colors, while high transparency pixels (non-blemish areas) will have the same or a very similar color after a blemish removal operation.

The standard pixel mask corresponds to a user selection of one or more pixels in the digital image and provides a standard level of opacity (e.g., a soft brush). The extended pixel mask includes and overlaps with the opaque regions of the standard pixel mask, but expands the boundaries of the standard pixel mask outwardly with increasing transparency towards the expanded boundaries (e.g., a very soft brush) along a more gradual gradient than the standard pixel mask. While the standard pixel mask is visible to the user within a graphical user interface of the digital image editing application, the extended pixel mask is generally not visible to the user. The minimal output pixel mask is generated from pixels within both the standard pixel mask and the extended pixel mask, but the minimal output pixel mask has the same boundaries as the standard pixel mask.

To generate the minimal output pixel mask, weights are calculated for colors of pixels under the extended pixel mask as a function of the transparency of the pixels through the mask. These weighted colors are clustered, and the frequency at which a given color occurs in each cluster is stored in an array. The colors of pixels corresponding to the standard pixel mask are then compared to the array, and corresponding pixels in the minimal output pixel mask are assigned varying shades of transparency/opaqueness as a function of the color frequency, with transparency increasing with frequency of occurrence (e.g., pixels containing predominant colors in the source image are given more transparency than pixels containing less predominant colors). In some embodiments, the array may be sorted in descending weights to decrease the amount of time needed to search the array. A weighted blemish removal algorithm, such as a patch-based image synthesis operation (also referred to as content aware fill), is then applied to the source image pixels within the user-selected region using the minimal output pixel mask (rather than the standard pixel mask), with semi-transparent regions receiving a blend of source and patch pixel colors according to the level of transparency, while fully transparent pixels in the minimal output mask are not changed, and fully opaque pixels are replaced with the replacement pixel color.

Embodiments of the present disclosure provide significantly better results when removing larger blemishes or clusters of smaller blemishes than some existing blemish removal techniques. Furthermore, the resulting blemished-removed image retains lighting, texture and color effects that more closely resemble the original image because relatively small portions of the user-selected region are altered by the blemish removal algorithm. Numerous configurations and variations will be apparent in light of this disclosure.

As used in this disclosure, the term "blemish," in addition to its plain and ordinary meaning, includes one or more pixels of a digital image that contain colors that are different from nearby pixels in the image. Often, blemishes appear in images of human skin, but may also appear in images of any object, such as discolorations, scratches, nicks, chips, spots, streaks or other irregular markings that are visually distinct from the surrounding area. As disclosed herein, embodiments of the present disclosure can be used to change the colors of at least some of the pixels containing the blemish, and in some cases also change the colors of pixels near the blemish, to reduce or eliminate visibility of the blemish to the human eye.

As used in this disclosure, the term "opacity value," in addition to its plain and ordinary meaning, includes a value representing the opacity, or conversely, the transparency, of a pixel through a pixel mask. In some embodiments, the opacity value is a value between 0.0 and 1.0, where 0.0 represents a completely transparent pixel and 1.0 represents a completely opaque pixel, as a result of the pixel mask. Completely opaque pixels are not visible through the pixel mask, while completely transparent pixels are completely visible through the pixel mask. Opacity values between 0.0 and 1.0 have varying degrees of opacity/transparency.

As used in this disclosure, the term "blemish removal" refers to a process in which the colors of one or more pixels in an image are altered in a way that causes the appearance of the image to change. For example, the colors of pixels containing a blemish can be changed to match the colors of pixels surrounding the blemish, which effectively removes or hides the blemish from view. In some embodiments, a patch-based image synthesis technique can be used for blemish removal, in which pixels containing the blemish are replaced with colors of pixels from other portions of the image (also referred to as patches) using existing patch-based image synthesis algorithms. The blemish removal algorithm (e.g., content aware fill) can be configured to find replacement patch colors from anywhere in the source image, not just from the area of the extended pixel mask. For example, the portions of the source image chosen for replacing the blemish regions may include multiple small patches from different areas of the source image that are similar in color and texture to the blemish regions. Some example patch-based image synthesis techniques that can be used in conjunction with various embodiments are described in Barnes et al, "PatchMatch: A Randomized Correspondence Algorithm for Structural Image Editing," ACM Transactions on Graphics (Proc. SIGGRAPH) 28(3), August 2009, http://gfx.cs.princeton.edu/gfx/pubs/Barnes_2009_PAR/patch-match.pdf, which is incorporated herein by reference in its entirety.

Example System

FIG. 1 shows an example digital image editing system 100, in accordance with an embodiment of the present disclosure. The system 100 includes a computing device 110 configured to execute a digital image editing application 120. The digital image editing application 120 includes a blemish removal module 122 and a graphical user interface (GUI) 124. The digital image editing application 120 is configured to receive a source image 130 and to generate a destination image 132. The source image 130 and the destination image are each formed of color pixels. The digital image editing application 120 is further configured to receive, via the GUI 124, a user selection of at least a portion of the pixels in the source image 130. The user selection may, for example, include a region of pixels containing a blemish that the user wishes to remove from the source image 130 or otherwise alter. In response to receiving the user selection, the digital image editing application 120 is further configured to perform, via the blemish removal module 122, a blemish removal operation on the source image 130, and more particularly, on the user-selected region of the source image 130, as will be described in further detail with respect to FIGS. 2A, 2B, 3 and 4. The destination image 132 is the result of performing the blemish removal operation on the source image 130. The source image 130 and the destination image 132 may be stored, for example, in any number of suitable file formats, including PNG, JPEG, TIF, GIF, etc.

Example Blemish Removal Operation

Figure 2A:
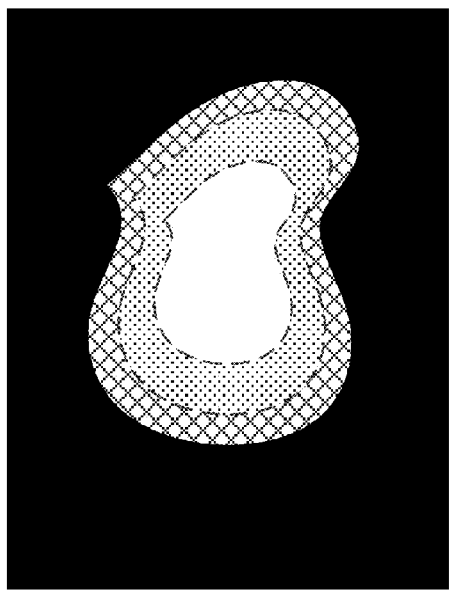
FIGS. 2A, 2B and 3 show an example of several pixel masks that can be used for blemish removal, in accordance with an embodiment of the present disclosure.
Figure 2A:
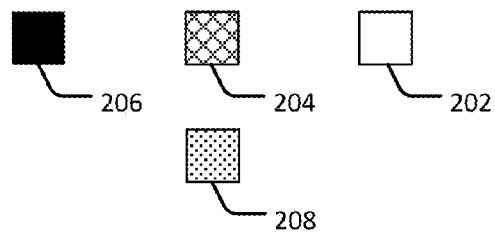
Figure 3:
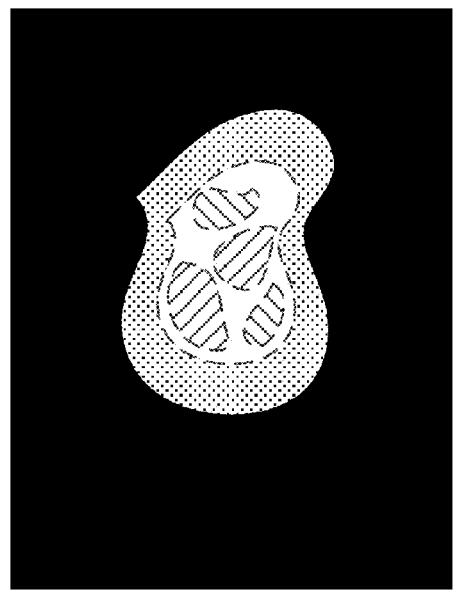
Figure 3:
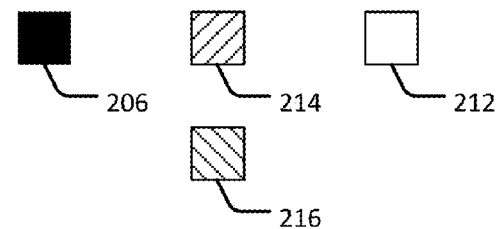
Figure 2B:
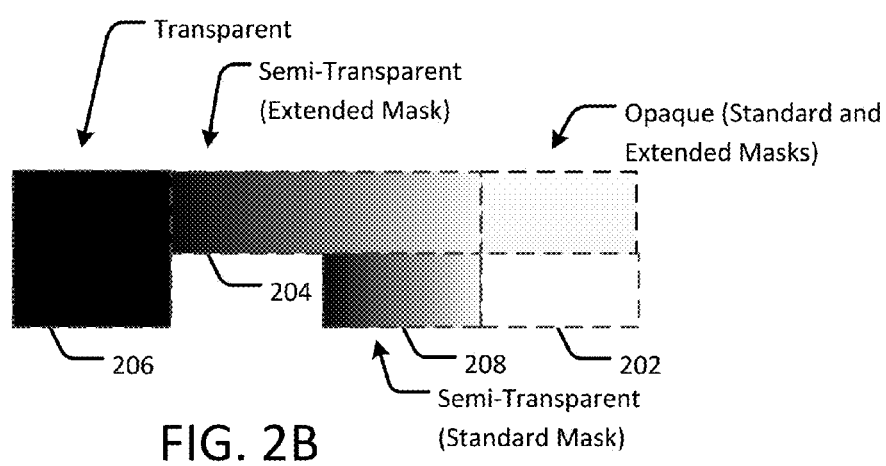

FIGS. 2A, 2B and 3 show examples of several pixel masks 202, 204, 206, 208, 212 that can be used for digital image blemish removal, in accordance with an embodiment of the present disclosure. It will be understood that the examples provided in FIGS. 2A, 2B and 3 are representative, and that the visual appearance of the pixel masks 202, 204, 206, 208, 212 within a user interface may vary, as will be apparent in light of this disclosure (see, for example, FIGS. 6B, 6C, 6E, and 6G). It will also be understood that FIGS. 2A, 2B and 3 are not drawn to scale, and that the size and shape of certain elements in the figures may be exaggerated for clarity. Each of the pixel masks 202, 204, 206, 208, 212 corresponds to pixels in a source image (e.g., image 130 of FIG. 1), and can be used in conjunction with a blemish removal algorithm to modify the colors of at least some of the pixels in the source image to produce a destination image (e.g., image 132 of FIG. 1).

In FIG. 2A, the white and shaded portions 202 and 208 represent a standard pixel mask that corresponds to a region of source image pixels that a user has selected using a digital image editing selection tool, such as a paintbrush, marquee, lasso, wand or pencil. Source image pixels covered by the standard pixel mask may contain, for instance, a blemish that the user wishes to remove from the image or otherwise alter.

The cross-hatched and black portions 204, 206 in FIG. 2A represent regions of the source image that the user has not selected. The cross-hatched portion 204 represents an extended pixel mask that corresponds to source image pixels outside of the standard mask and the user-selected region. In some embodiments, the extended pixel mask corresponds to source image pixels in a region including and adjacent to the standard mask. That is, the extended pixel mask includes the white, shaded and cross-hatched portions 202, 204, 208. The black portion 206 represents a background pixel mask that corresponds to source image pixels not covered by either the standard pixel mask or the extended pixel mask. In some embodiments, the standard pixel mask and the background pixel mask are visible to the user via a graphical user interface (GUI) of an image editing tool, but the extended pixel mask (e.g., the cross-hatched portion 204 of FIG. 2A) is not visible. Instead, the region including the extended pixel mask appears in the GUI as part of the background pixel mask (e.g., the black portion 206 of FIG. 2A).

The standard pixel mask has one or more opacity values that correspond to the selected pixels. For example, the standard pixel mask may include 50% transparent pixels and 50% opaque pixels over the entire mask region, with the opaque pixels generally near the center of the standard pixel mask (e.g., as represented by the white region 202) and increasingly transparent pixels generally toward the edges of the standard pixel mask (e.g., as represented by the shaded region 208). While the user is selecting the region, it is natural for the user to keep the blemish within the selected region, although the selection does not need to precisely correspond to the blemish. Furthermore, it is likely that if a user wishes to remove a blemish from an image, the user will make sure to over-brush the edges of the blemish with the selection tool, thereby placing the blemish generally in the center of the selected region and also including areas surrounding the blemish. As a result, pixels closer to the center of the selected region are potential candidates for removal and have a higher probability of containing a blemish. The center of the standard pixel mask (e.g., as represented by the white region 202) may therefore include completely opaque pixels (0% transparency), since the center of the user selection has the highest probability of including a blemish. In contrast to the center of the standard pixel mask, the over-brushed areas away from the center of the mask (e.g., as represented by the shaded region 208) are more likely to contain non-blemished pixels, or so-called good pixels, that can be used to replace pixels in the blemish.

The extended pixel mask includes the area covered by the standard pixel mask (e.g., the extended pixel mask overlaps with the white and shaded regions 202, 208) and is based upon the premise that, since the over-brushed areas of the standard pixel mask (e.g., the shaded region 208) are likely to include good, non-blemished pixels, additional good pixels also exist in a wider region adjacent to or near the over-brushed portions of the user selection (e.g., the cross-hatched region 204). In some embodiments, the width of the extended mask is proportional to the width of the tool used for the user selection. For example, if the width of a paintbrush tool is ten pixels, including eight opaque pixels and one transparent pixel on either side of the eight opaque pixels, then the width of the extended pixel mask may be two pixels beyond any side of the standard pixel mask, making the overall width of the extended pixel mask fourteen pixels (2+10+2=14). In another example, if the width of the paintbrush toll is ten pixels including ten opaque pixels and no transparent pixels, then the width of the extended pixel mask may be six pixels beyond any side of the standard pixel mask 202, making the overall width of the extended pixel mask twenty-two pixels (6+10+6=22). Other variations for the width of the extended pixel mask will be apparent. For example, if an edge of the standard pixel mask is near the edge of the source image, the extended pixel mask may necessarily be small or zero since the extended pixel mask cannot extend beyond the edge of the source image.

Similar to the standard pixel mask, the extended pixel mask also has one or more opacity values that correspond to the pixels covered by the extended pixel mask. FIG. 2B shows one representative example of a portion of the extended pixel mask of FIG. 2A, in which the opaque regions 202 correspond with the opaque regions of the standard mask, and the transparency of the pixels under the extended pixel mask increases closer to the outer boundary (away from the standard pixel mask), since the prevalence of good pixels increases probabilistically with the distance from the center of the standard mask. For example, the transparency of pixels covered by the extended pixel mask may increase along a gradient that is a function of the width of the extended pixel mask (e.g., region 204) but is more gradual than the gradient of the standard pixel mask (e.g., region 208).

Referring now to FIG. 3, the standard pixel mask and the extended pixel mask of FIG. 2A can be used to generate a minimal output pixel mask, which includes regions 212, 214, and 216, each of varying opacity or transparency. The minimal output pixel mask covers the same region of the source image, and has the same bounds, as the standard pixel mask (e.g., the regions 212, 214 and 216 are collectively co-extensive with regions 202 and 208 of FIG. 2A). However, the minimal output pixel mask includes one or more regions (e.g., 214, 216) where the opacity, or conversely, the transparency, of the pixels is different than the standard pixel mask. For example, areas in the white portion 212 of the minimal output pixel mask may have the same opacity as in the corresponding standard pixel mask 202 (e.g., 0% transparent), while areas in the hatched portions 214, 216 may be more transparent than the areas in the white portion 212 (e.g., 50% transparent and 75% transparent, respectively). In this manner, the minimal output pixel mask preserves the blemish areas (e.g., under the white portion 212) as higher opaque shades from the standard pixel mask, while increasing the transparency of non-blemish areas (e.g., 214, 216) transparency of specific regions in standard pixel mask. As such, the number of opaque pixels in the minimal output pixel mask is less than in the standard mask. Thus, fewer pixels in the source image are modified by a blemish removal operation applied to the minimal output pixel mask than if the same operation was applied to the standard mask.

To generate the minimal output pixel mask, initially colors of pixels covered by the extended pixel mask are given increasingly greater weights (e.g., within the range of 0 to 1) as a function of the transparency of the respective pixels (which increases as a function of the distance from the center of the standard mask). The weights may be, for instance, inversely proportional to the amount of transparency in the extended pixel mask for transparent pixels in the extended pixel mask. For opaque pixels in the extended pixel mask, which are also mainly opaque in the standard pixel mask, a constant factor is added, which is proportional to the area of the selection. This is because, if the selection is large, there is a high probability the selection includes good pixels, which do not need to be replaced (e.g., constant factor=(area of selection)/(area of source*2)). For every pixel having a particular color in the source image that is covered by the extended pixel mask, the weight is added to the corresponding array element.

The minimal output pixel mask is generated by clustering colors of pixels covered by the extended pixel mask using, for example, a standard clustering technique (such as K-Means or its variations). Clustering may, for example, be based on how close one color is to another. In some embodiments, the center of each cluster represents a signature color for that cluster. The signature color for each cluster can be used to find the distance between the cluster and the color of the respective source image pixel, and also for comparing the source image pixel color against a threshold value, as described in further detail below. However, the size of each cluster may be different, and in some cases the representative color may not be at the exact center of the cluster (e.g., the representative color may be the median color or the most prevalent color or mixture.) Since different colors have different weights, the clustering may change, and the representative color may also change (e.g., if a color has a low weight, that color will not have much effect on the representative color, but a color with higher weight will have a greater effect on the representative color of the cluster). Note that one particular color may be found n times at different locations and may have different weights. The weight of this particular color is the total of all weights for each instance of this color in the cluster. The number of clusters can be dynamically determined based, for example, on the range of colors in the source image. The number of clusters may, in some cases, be manually tuned or adjusted by the user. In some embodiments, a red-green-blue (RGB) or other three-channel color space is utilized for clustering. However, other color spaces, such as YIQ (in-phase quadrature) and LAB, which have different combinations of two color channels and luminosity, may be used. In some embodiments, the number of pixels of each color in the source image that are covered by the standard pixel mask 202 and the extended pixel mask 204 is stored in a three-dimensional (3D) array of RGB values. For example, the dimensions of the array may include red, green and blue, each having possible values in the range of zero to 255. In some embodiments, the array can be divided by a factor to club similar colors together to create clusters and to save memory (e.g., array=[0 . . . 255/factor][0 . . . 255/factor][0 . . . 255/factor], where factor=6, although it will be understood that any suitable factor can be used).

The 3D array is, in some embodiments, sorted by the weighted number of pixels for each color cluster, and a threshold value is identified. The threshold value establishes the number of colors in a given cluster above which the cluster is considered to contain good pixels. For example, if the threshold value is ten, then any cluster containing ten, or more than ten, colors is considered to include a good pixel, which may be used for pixel replacement during a blemish removal operation. Likewise, any cluster containing fewer than ten colors is not considered a good pixel, and may not be used for pixel replacement. In some embodiments, the threshold value is a user-selectable value for deciding whether to keep or replace a given source pixel during a blemish removal operation (e.g., the threshold point can be changed with a GUI-based slider). In general, a higher threshold value represents a greater number of opaque pixels in the minimal output pixel mask, which in turn causes more pixels in the selected area to be replaced during blemish removal. For example, the user may be allowed to choose the desired amount of blemish removal n via a slider, which finds the $n^{th}$ element in the array. In some cases, the threshold value may, for instance, be proportional to 'areaFactor' and the square/cube of the slider value, as shown in the following equation:

$$\text{threshold} = \text{uniqueColors}[(\text{uniqueColors.size}()-1)*\text{areaFactor}]*(1.0 + (\text{sliderSetting}*\text{sliderSetting}*\text{sliderSetting}/400000.0)),$$

where sliderSetting represents the position of the slider along a range of values between 0 and 100, and areaFactor is a constant.

In tablet and mobile computing applications, a minimalistic GUI may be preferable, in which case the slider is optional and the threshold value is automatically calculated such that the slider value is proportional to the ratio between the size of the selected area and the size of the total area of the source image.

The maximum transparency of a given pixel covered by the minimal output pixel mask is less than or equal to the minimum transparency of the corresponding pixel covered by the standard pixel mask. To determine the transparency of certain pixels in the minimal output pixel mask, the 3D array is searched for colors of source pixels corresponding to the standard pixel mask. If no colors are found in the array, the corresponding point in the minimal output pixel mask is set to opaque (0% transparency). Otherwise, the corresponding points in the minimal output pixel mask are assigned varying shades of transparency according to the total weight of the corresponding colors in the array (greater than 0% transparency) (e.g., the total cluster weight). For colors in the source image that are higher than the threshold value (representing good colors), the corresponding point in the minimal output pixel mask is completely transparent (100% transparency). Once the minimal output pixel mask is generated, in some embodiments, a conventional blemish removal operation (e.g., content aware fill or CAF) can be applied to the source image using the minimal output pixel mask instead of using the standard mask to produce the destination image with the blemish removed. For example, the CAF operation is not applied on completely transparent portions, but is applied partially on any partially opaque area by blending the original and new pixels, where the amount of color blended from the new pixels is greater if the mask is more opaque and less if the mask is more transparent), and applied fully (replacement with no blending) if the mask is fully opaque.

Example Methodology

Figure 4:
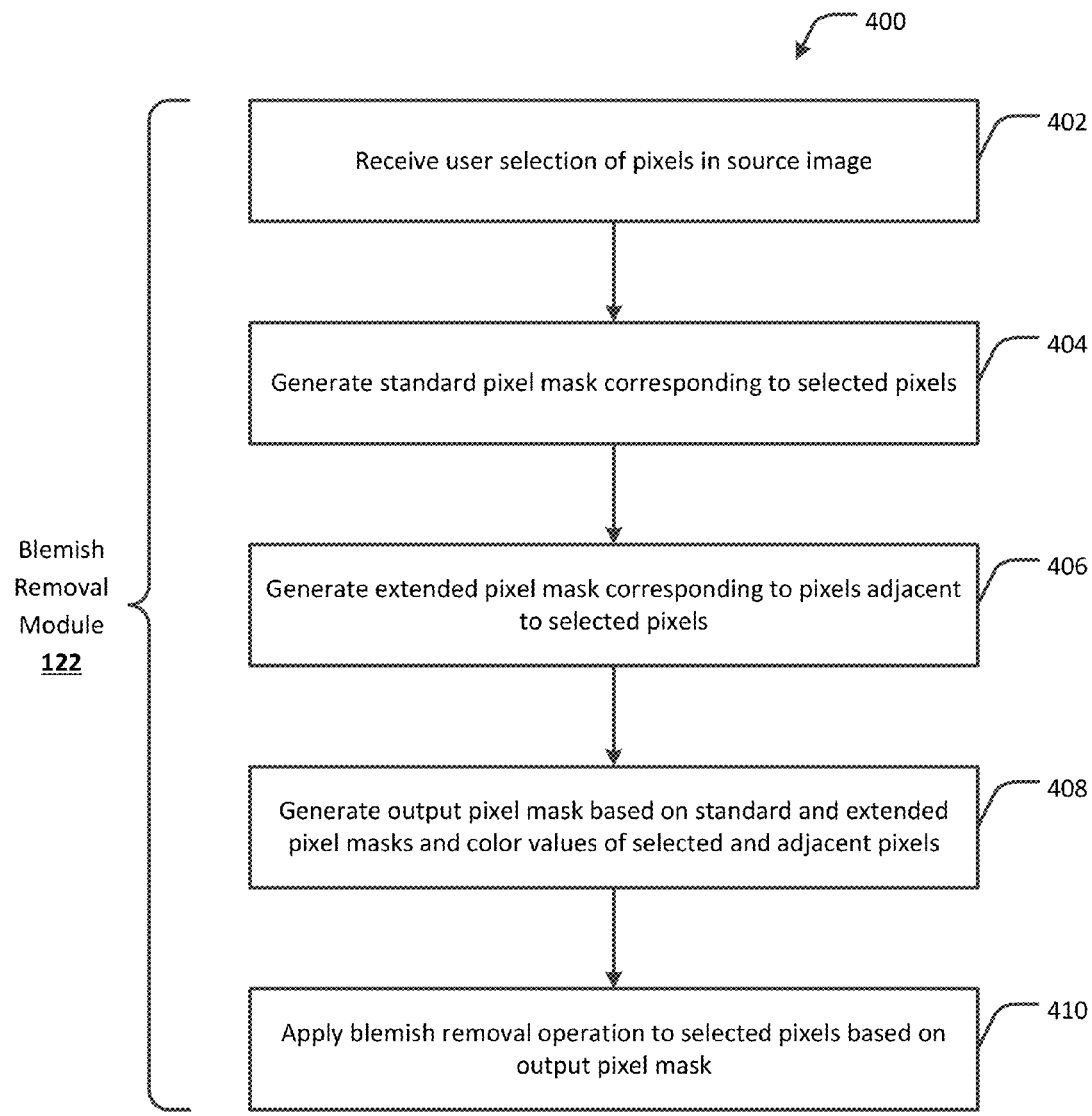
FIGS. 4 and 5 are flow diagrams of a digital image blemish removal methodology, in accordance with several embodiments of the present disclosure.
Figure 5:
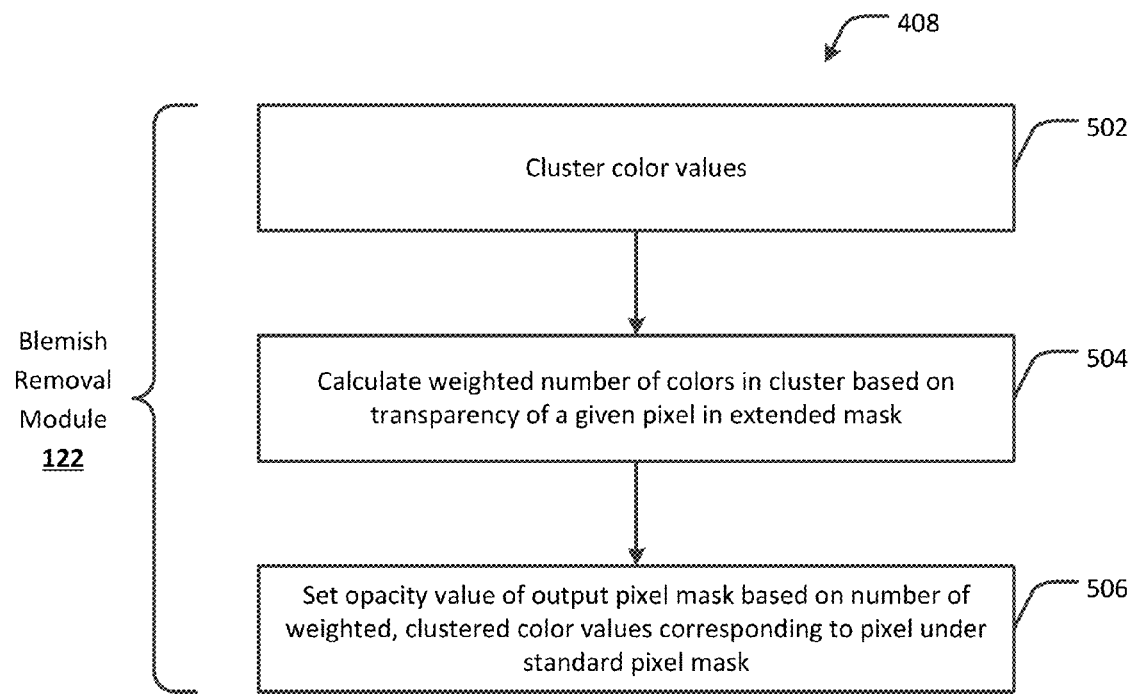

FIGS. 4 and 5 are flow diagrams of a digital image blemish removal methodology 400, in accordance with several embodiments of the present disclosure. The method 400 may, for example, be implemented in the computing device 100 of FIG. 1, and more particularly, in the blemish removal module 122 of the digital image editing application 120. The method 400 begins by receiving 402 an input representing a selection of pixels in a digital source image. Each of the selected pixels is associated with a color (e.g., from zero to 255 for a red, green or blue color component). The method 400 continues by generating a standard pixel mask 404, an extended pixel mask 406, and a minimal output pixel mask 408. The standard pixel mask has a first set of opacity values corresponding to the selected pixels. The extended pixel mask has a second set of opacity values corresponding to pixels adjacent to, or otherwise outside of, the selected pixels (e.g., pixels outside of the standard mask). In some embodiments, the second set of opacity values decreases as a function (e.g., gradient) of a distance between a given pixel under the extended pixel mask and one of the selected pixels under the standard pixel mask, such as shown and described with respect to FIG. 2B. In some embodiments, the method 400 includes displaying indicia of the standard pixel mask in a graphical user interface and via a display device. For example, the standard pixel mask may appear as the white region in FIG. 2A. However, no indicia of the extended pixel mask are displayed to the user (e.g., the cross-hatched region 204 of FIG. 2A is not shown; instead, the cross-hatched region appears as part of the black region 206).

The minimal output pixel mask has a third set of opacity values corresponding to the selected pixels. The third set of opacity values is based on the first and second sets of opacity values, and on the colors of the selected pixels (e.g., under the standard mask) and the pixels outside of the selected pixels (e.g., under the extended pixel mask). In some embodiments, each of the first, second and third opacity values range from 0.0 to 1.0 inclusive, wherein 0.0 represents fully transparent and 1.0 represents fully opaque.

In some embodiments, as shown in FIG. 5, generation of the minimal output pixel mask 408 includes clustering 502 the colors values of pixels in the extended pixel mask (e.g., using K-Means clustering or another suitable clustering technique) and calculating 504 a weighted number of colors in each cluster, where each cluster has a representative color. The weight for a given pixel in the extended pixel mask is proportional to an amount of transparency in the extended pixel mask for transparent pixels and is a constant proportional to a ratio of an area of the standard pixel mask to a total area covered by fully opaque pixels. Such a weighting thus favors use of good pixels and discourages use of blemish pixels during the blemish removal operation. Each of the third plurality of opacity values in the minimal output pixel mask is set 506 as a function of the number of corresponding weighted, clustered colors in a corresponding cluster, where a given one of the third plurality of opacity values is fully transparent above a threshold number of colors and has reducing transparency as the number of colors decreases below the threshold.

In some embodiments, the second plurality of opacity values is greater than the corresponding first plurality of opacity values for semi-opaque pixels and the same for opaque pixels and decreases as a function of a distance from a center of the standard pixel mask and between a given pixel under the extended pixel mask and one of the selected pixels under the standard pixel mask. The resulting minimal output pixel mask has more transparent pixels than the standard pixel mask. In some embodiments, each of the third set of opacity values in the minimal output pixel mask is less than or equal to a corresponding one of the first set of opacity values in the standard mask; that is, the transparency at each pixel in the minimal output pixel mask is less than or equal to the transparency of the corresponding pixel in the standard pixel mask.

Referring again to FIG. 4, the method 400 continues by applying 410 a blemish removal operation to the selected pixels based on the third set of opacity values in the minimal output pixel mask. In some embodiments, the blemish removal operation includes a patch-based image synthesis or a content aware fill operation that is performed on opaque pixels and on pixels that are partially transparent in the minimal output pixel mask. The blemish removal operation is not performed on completely transparent portions of the minimal output pixel mask. The patch-based image synthesis or content aware fill is applied fully on completely opaque regions, and applied partially on partially transparent regions. When patch-based image synthesis or content aware fill is applied partially, for example, the colors from the replacement patches may be blended with the original pixel colors proportionally to the degree of transparency of the mask region, with more transparent regions receiving a lower proportion of the replacement colors than the more opaque regions.

Example Results

Figure 6B:
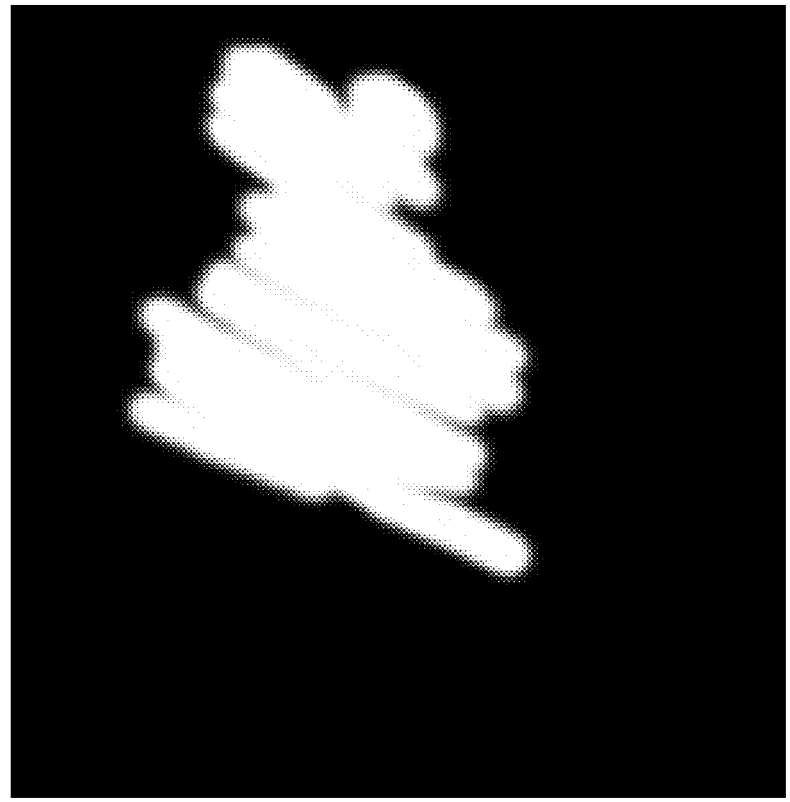
FIGS. 6A-6H show several example results of a blemish removal operation, in accordance with an embodiment of the present disclosure.
Figure 6A:
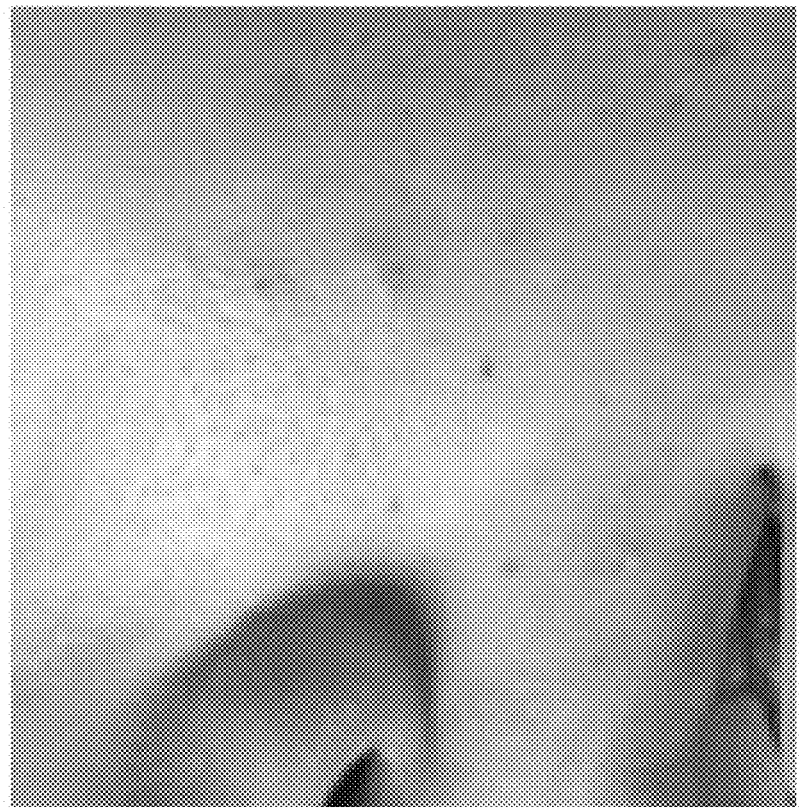
Figure 6D:
Figure 6C:
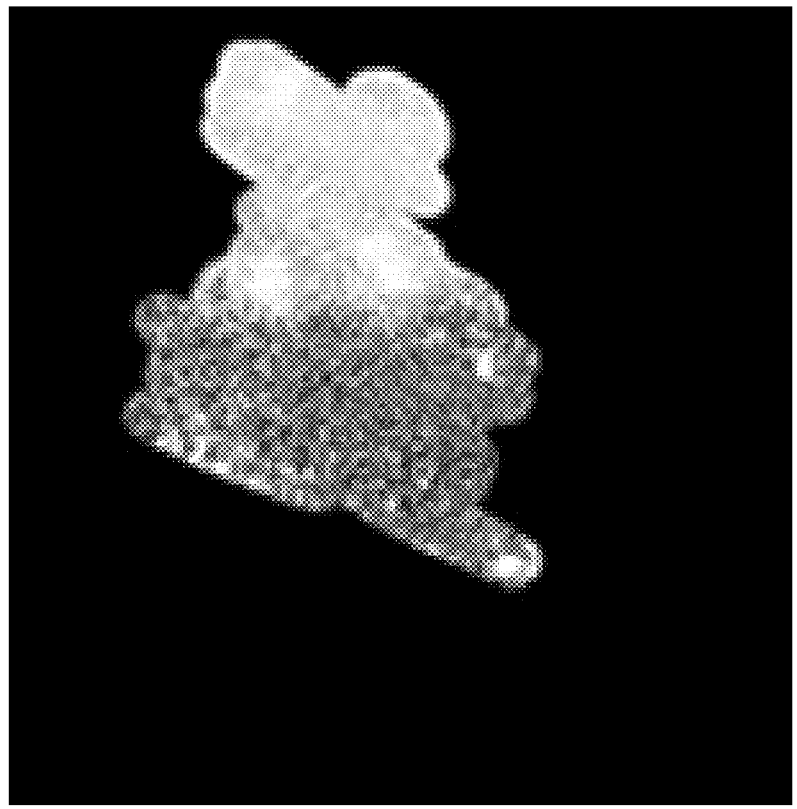
Figure 6F:
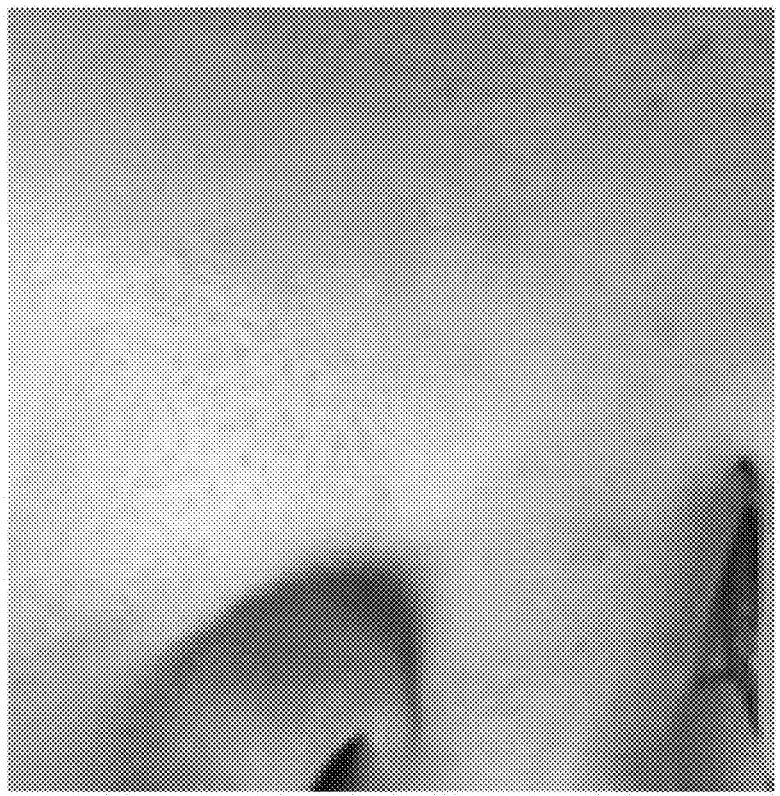
Figure 6E:
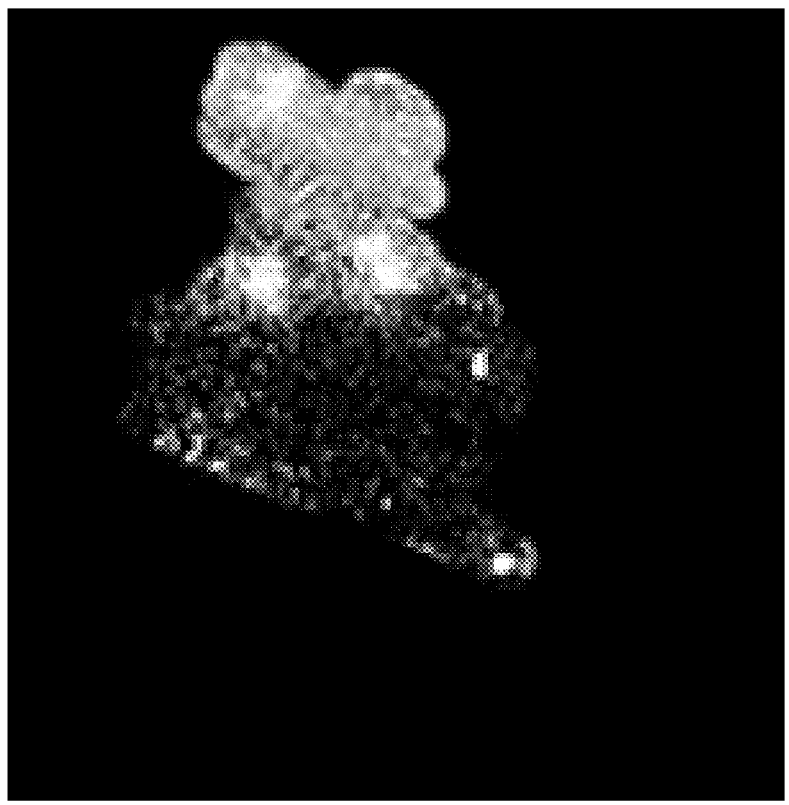
Figure 6H:
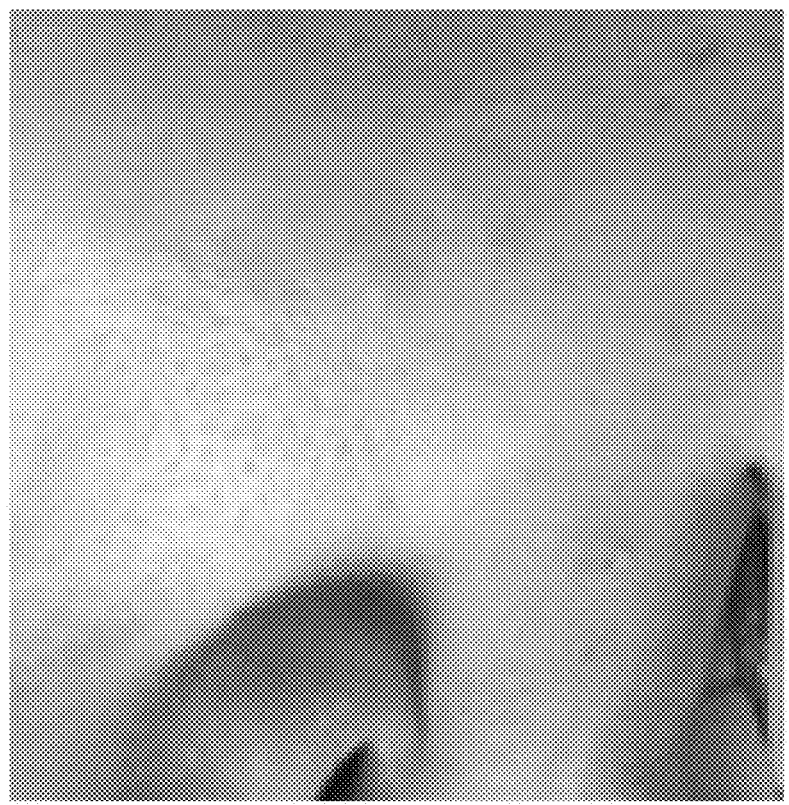
Figure 6G:
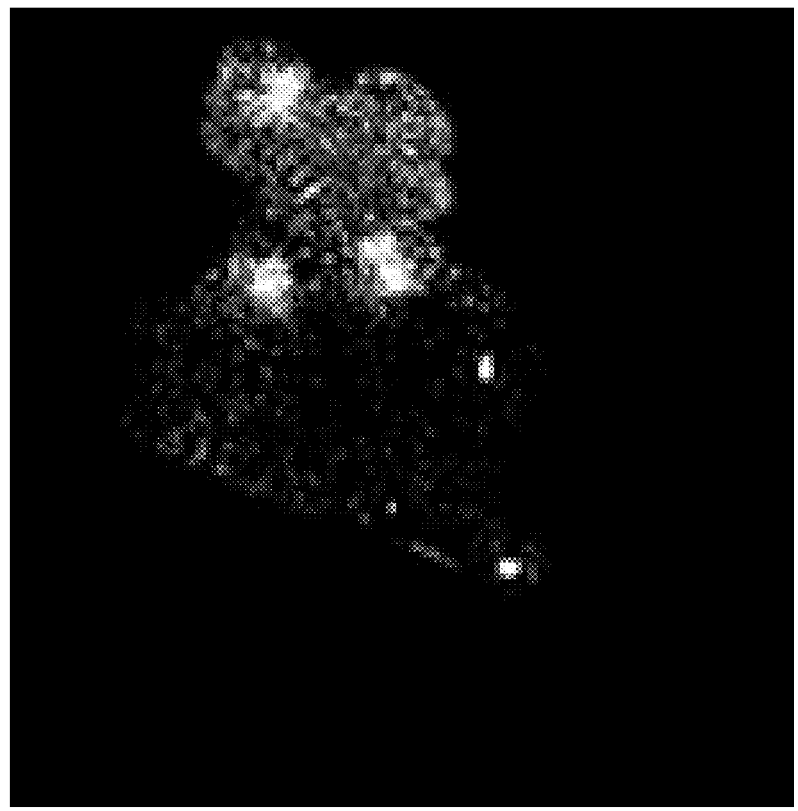

FIGS. 6A-6H show several example results of a blemish removal operation, in accordance with an embodiment of the present disclosure. FIG. 6A is a source image containing a blemish. FIG. 6B shows a standard pixel mask over a user-selected region of the source image that includes the blemish. Note that the standard pixel mask is uniformly white, which represents high opacity. Black regions represent high transparency. Further note that an extended pixel mask, which is adjacent to the standard pixel mask, exists but is not visible to the user. FIG. 6C shows a minimal output pixel mask, which has the same bounds as the standard pixel mask but has varying levels of opacity/transparency, as evidenced by the range in grayscale between black and white. In the example of FIG. 6C, the color threshold is relatively high (e.g., 80%), which causes a relatively large portion of the minimal output pixel mask to remain opaque. FIG. 6D is a destination, or output, image resulting from a blemish removal operation applied to the source image (FIG. 6A) using the minimal output pixel mask (FIG. 6C). FIG. 6E shows another minimal output pixel mask, having a lower color threshold (e.g., 60%) than the mask of FIG. 6C, which causes a smaller portion of the minimal output pixel mask to remain opaque and a greater portion to become transparent. FIG. 6F is a destination, or output, image resulting from a blemish removal operation applied to the source image (FIG. 6A) using the minimal output pixel mask (FIG. 6E). FIG. 6G shows yet another minimal output pixel mask, having an even lower color threshold (e.g., 40%) than the mask of FIG. 6E, which causes an even smaller portion of the minimal output pixel mask to remain opaque and a greater portion to become transparent. FIG. 6H is a destination, or output, image resulting from a blemish removal operation applied to the source image (FIG. 6A) using the minimal output pixel mask (FIG. 6G).

Figure 7A:
FIGS. 7A-7D show several example results of a blemish removal operation, in accordance with an embodiment of the present disclosure.
Figure 7B:
Figure 7C:
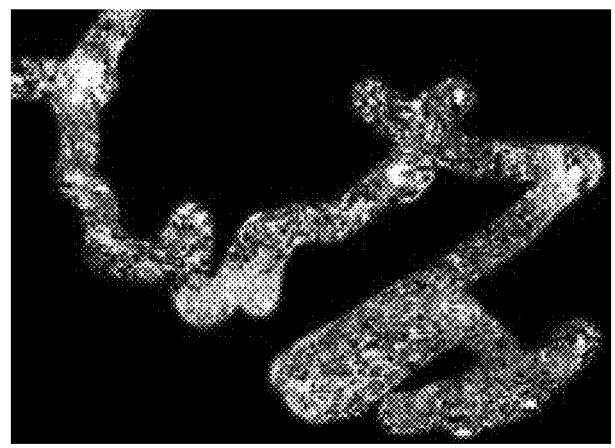
Figure 7D:

FIGS. 7A-7D show several example results of a blemish removal operation, in accordance with an embodiment of the present disclosure. FIG. 7A is a source image containing a blemish. FIG. 7B shows a standard pixel mask over a user-selected region of the source image that includes the blemish. Note that the standard pixel mask is uniformly white, which represents high opacity. Black regions represent high transparency. Further note that an extended pixel mask, which is adjacent to the standard pixel mask, exists but is not visible to the user. FIG. 7C shows a minimal output pixel mask, which has the same bounds as the standard pixel mask but has varying levels of opacity/transparency, as evidenced by the range in grayscale between black and white. In the example of FIG. 6C, the color threshold is relatively high (e.g., 80%), which causes a relatively large portion of the minimal output pixel mask to remain opaque. FIG. 7D is a destination, or output, image resulting from a blemish removal operation applied to the source image (FIG. 6A) using the minimal output pixel mask (FIG. 6C).

Figure 8A:
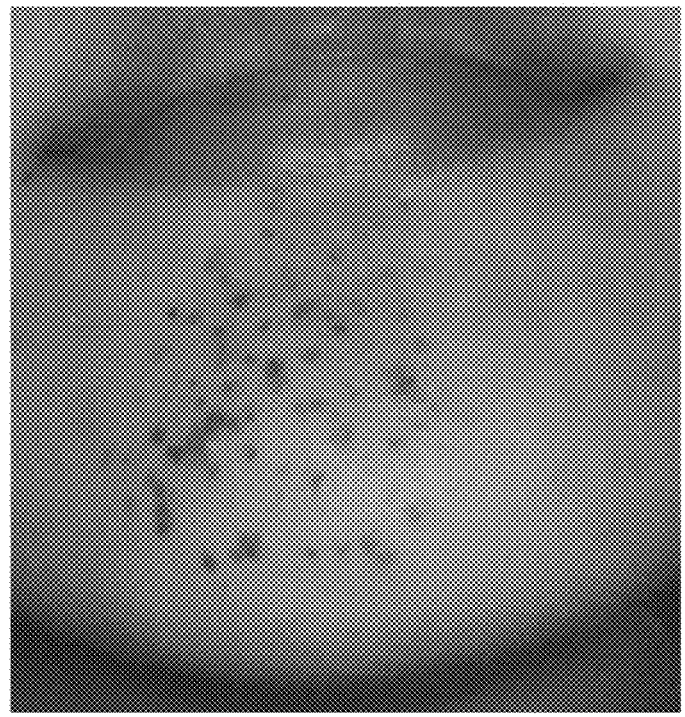
FIGS. 8A-8D show several example results of a blemish removal operation, in accordance with an embodiment of the present disclosure.
Figure 8B:
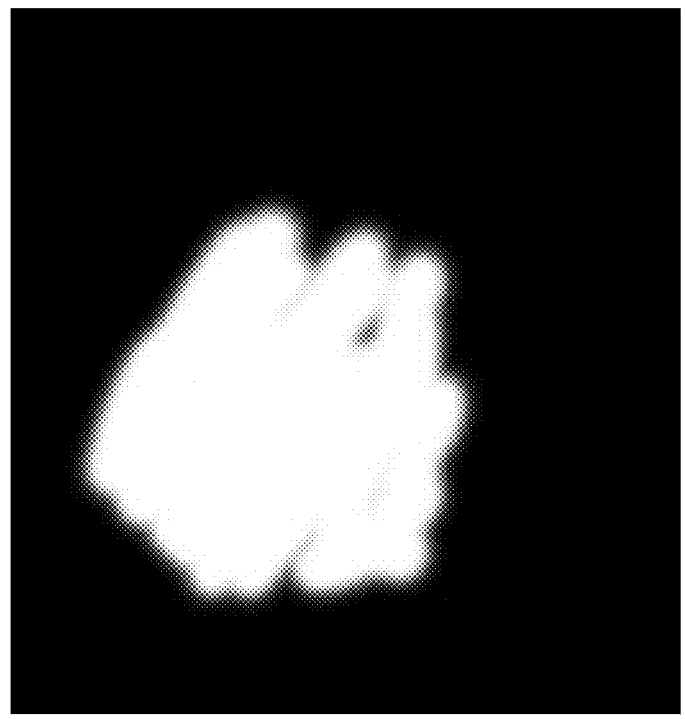
Figure 8C:
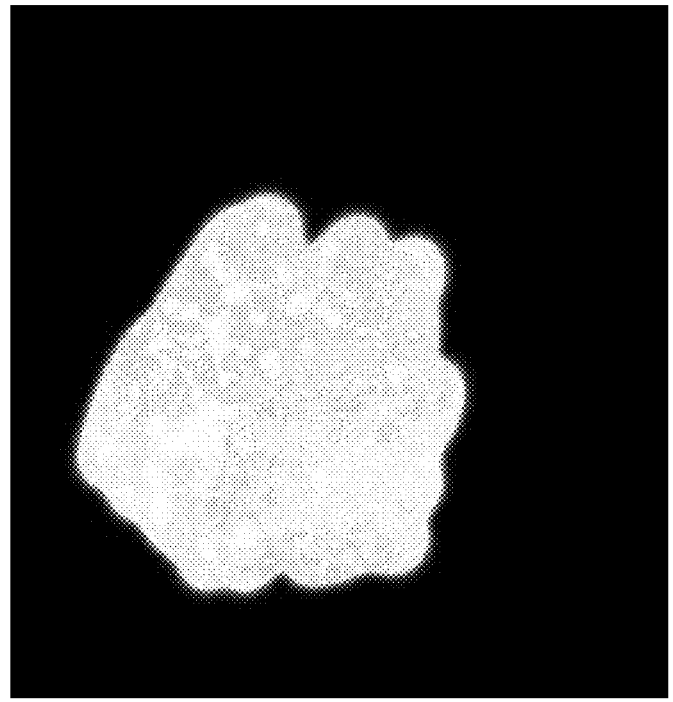
Figure 8D:
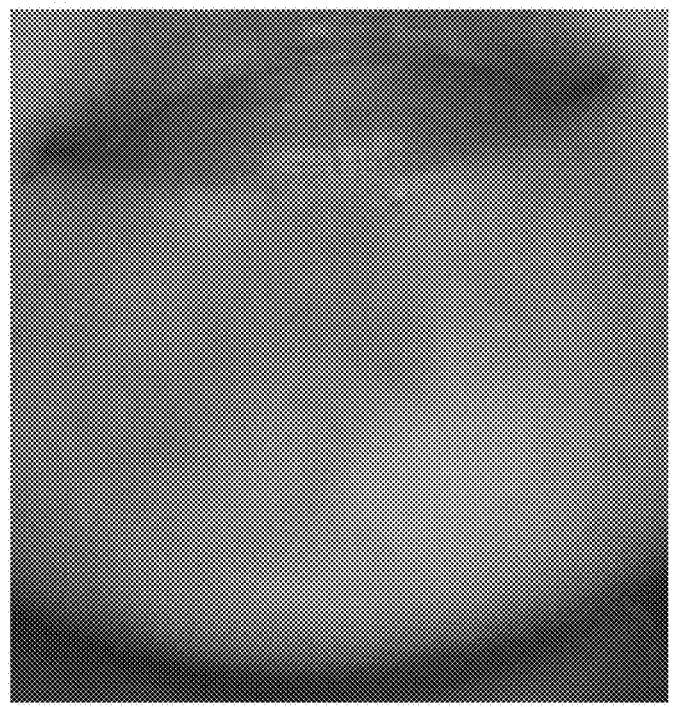

FIGS. 8A-8D show several example results of a blemish removal operation, in accordance with an embodiment of the present disclosure. FIG. 8A is a source image containing a blemish. FIG. 8B shows a standard pixel mask over a user-selected region of the source image that includes the blemish. Note that the standard pixel mask is uniformly white, which represents high opacity. Black regions represent high transparency. Further note that an extended pixel mask, which is adjacent to the standard pixel mask, exists but is not visible to the user. FIG. 8C shows a minimal output pixel mask, which has the same bounds as the standard pixel mask but has varying levels of opacity/transparency, as evidenced by the range in grayscale between black and white. In the example of FIG. 8C, the color threshold is relatively high (e.g., 100%), which causes a relatively large portion of the minimal output pixel mask to remain opaque. FIG. 8D is a destination, or output, image resulting from a blemish removal operation applied to the source image (FIG. 8A) using the minimal output pixel mask (FIG. 8C).

Figure 9A:
FIGS. 9A-9D show several example results of a blemish removal operation, in accordance with an embodiment of the present disclosure.
Figure 9B:
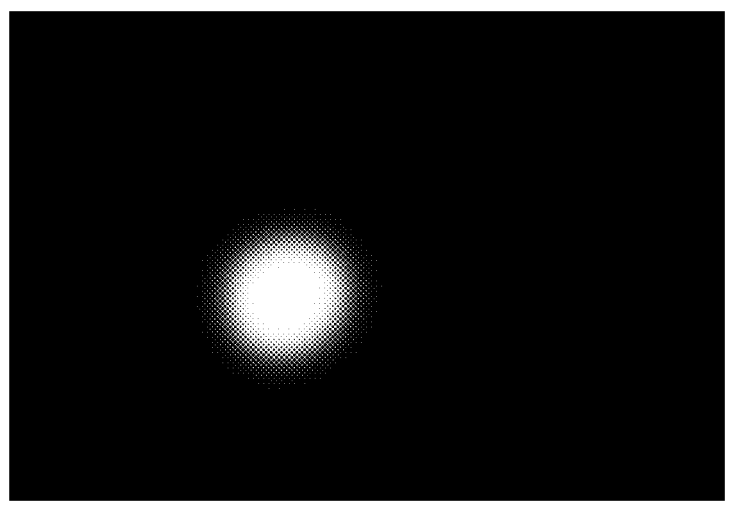
Figure 9C:
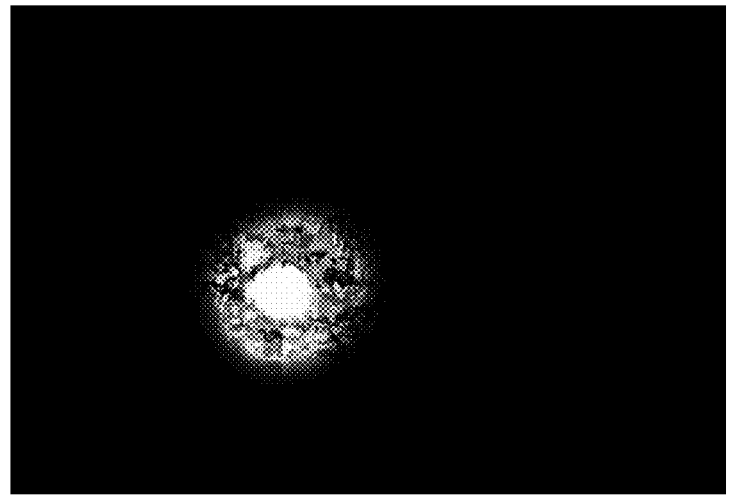
Figure 9D:

FIGS. 9A-9D show several example results of a blemish removal operation, in accordance with an embodiment of the present disclosure. FIG. 9A is a source image containing a blemish. FIG. 9B shows a standard pixel mask over a user-selected region of the source image that includes the blemish. Note that the standard pixel mask is uniformly white, which represents high opacity. Black regions represent high transparency. Further note that an extended pixel mask, which is adjacent to the standard pixel mask, exists but is not visible to the user. FIG. 9C shows a minimal output pixel mask, which has the same bounds as the standard pixel mask but has varying levels of opacity/transparency, as evidenced by the range in grayscale between black and white. In the example of FIG. 9C, the color threshold is relatively high (e.g., 90%), which causes a relatively large portion of the minimal output pixel mask to remain opaque. FIG. 9D is a destination, or output, image resulting from a blemish removal operation applied to the source image (FIG. 9A) using the minimal output pixel mask (FIG. 9C).

Figure 10A:
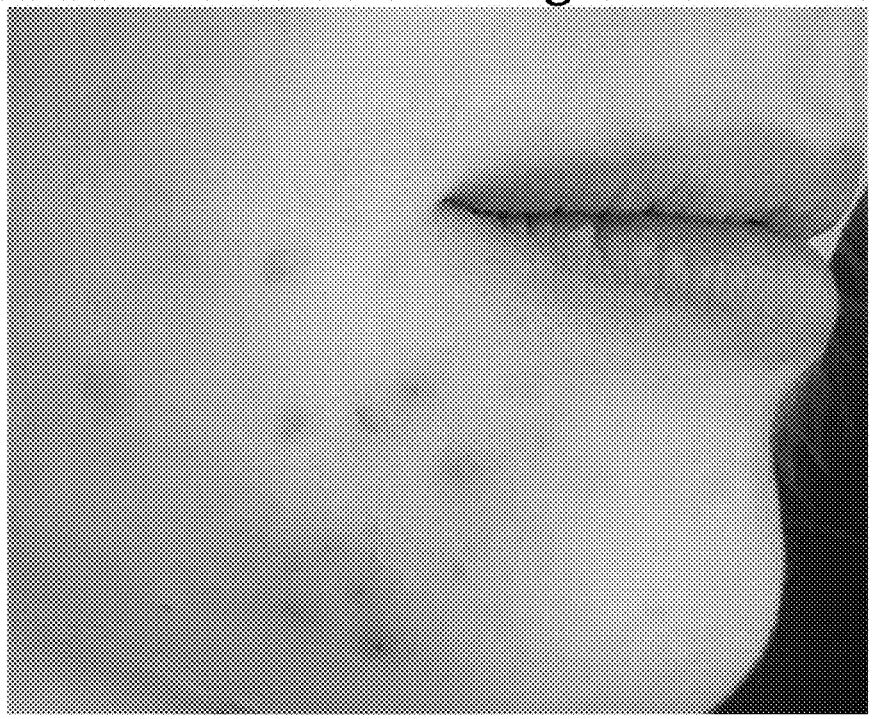
FIGS. 10A-10D show several example results of a blemish removal operation, in accordance with an embodiment of the present disclosure.
Figure 10B:
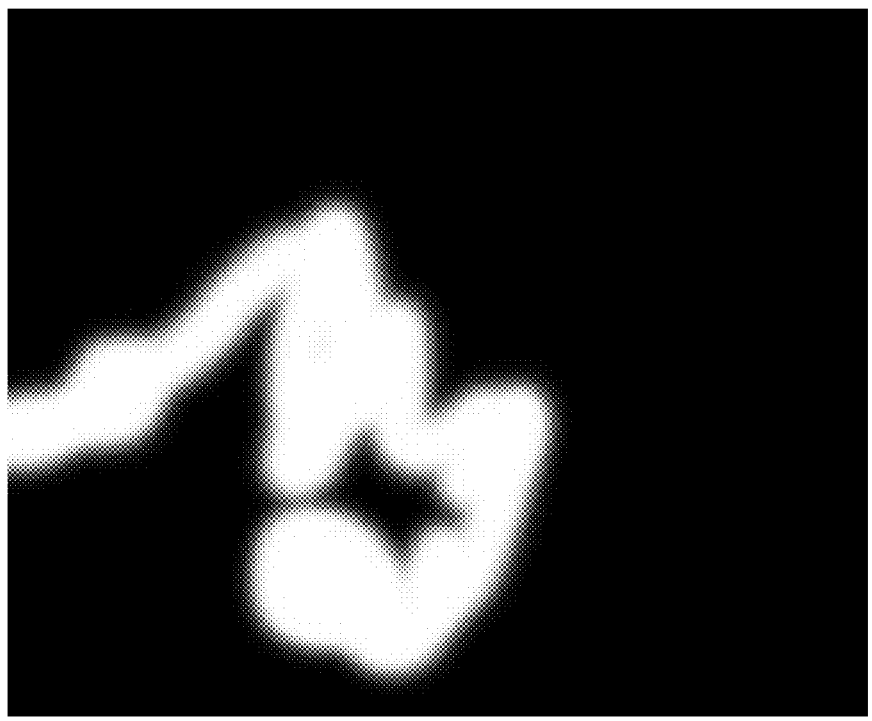
Figure 10C:
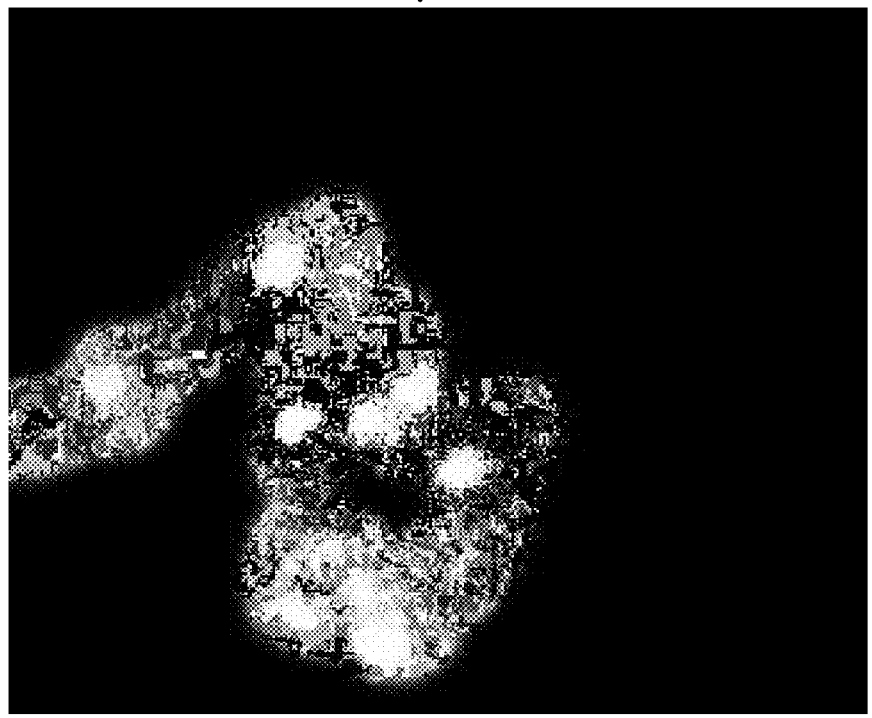
Figure 10D:
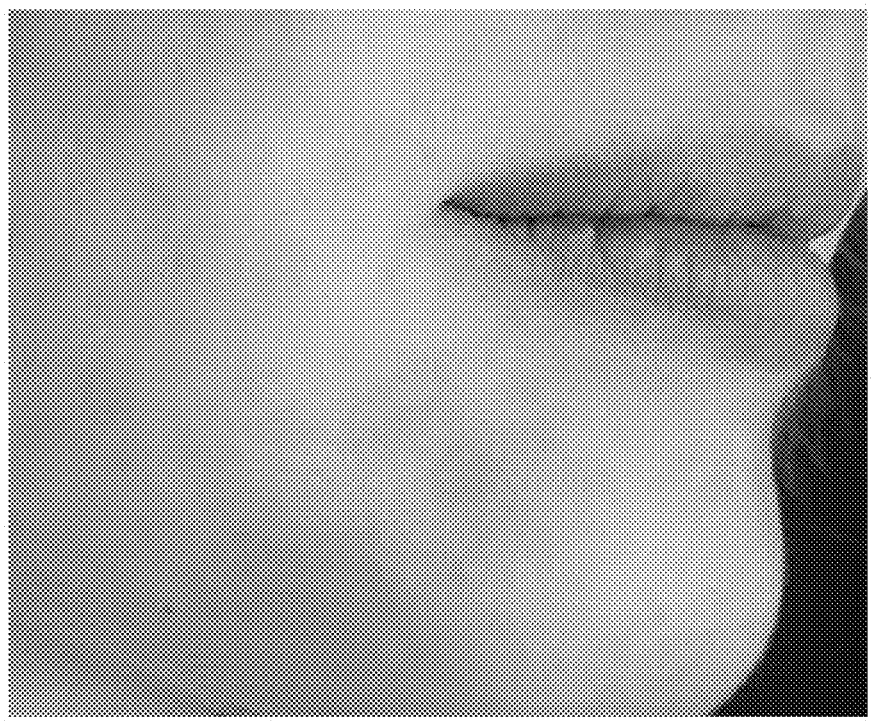

FIGS. 10A-10D show several example results of a blemish removal operation, in accordance with an embodiment of the present disclosure. FIG. 10A is a source image containing a blemish. FIG. 10B shows a standard pixel mask over a user-selected region of the source image that includes the blemish. Note that the standard pixel mask is uniformly white, which represents high opacity. Black regions represent high transparency. Further note that an extended pixel mask, which is adjacent to the standard pixel mask, exists but is not visible to the user. FIG. 10C shows a minimal output pixel mask, which has the same bounds as the standard pixel mask but has varying levels of opacity/transparency, as evidenced by the range in grayscale between black and white. FIG. 10D is a destination, or output, image resulting from a blemish removal operation applied to the source image (FIG. 10A) using the minimal output pixel mask (FIG. 10C).

Figure 11A:
FIGS. 11A-11D show several example results of a blemish removal operation, in accordance with an embodiment of the present disclosure.
Figure 11B:
Figure 11C:
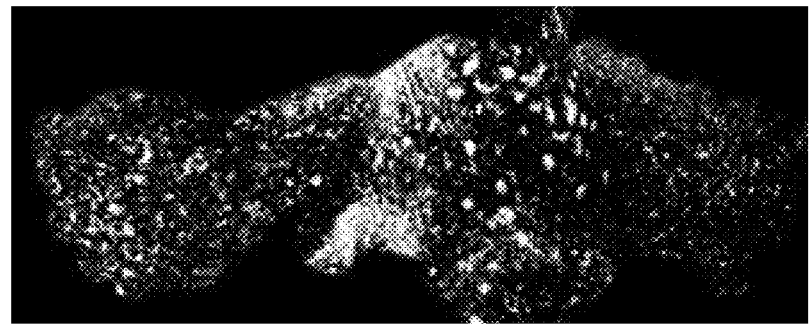
Figure 11D:

FIGS. 11A-11D show several example results of a blemish removal operation, in accordance with an embodiment of the present disclosure. FIG. 11A is a source image containing a blemish. FIG. 11B shows a standard pixel mask over a user-selected region of the source image that includes the blemish. Note that the standard pixel mask is uniformly white, which represents high opacity. Black regions represent high transparency. Further note that an extended pixel mask, which is adjacent to the standard pixel mask, exists but is not visible to the user. FIG. 11C shows a minimal output pixel mask, which has the same bounds as the standard pixel mask but has varying levels of opacity/transparency, as evidenced by the range in grayscale between black and white. In the example of FIG. 11C, the color threshold is moderate (e.g., 70%), which causes a significant portion of the minimal output pixel mask to become transparent. FIG. 11D is a destination, or output, image resulting from a blemish removal operation applied to the source image (FIG. 11A) using the minimal output pixel mask (FIG. 11C).

Figure 12A:
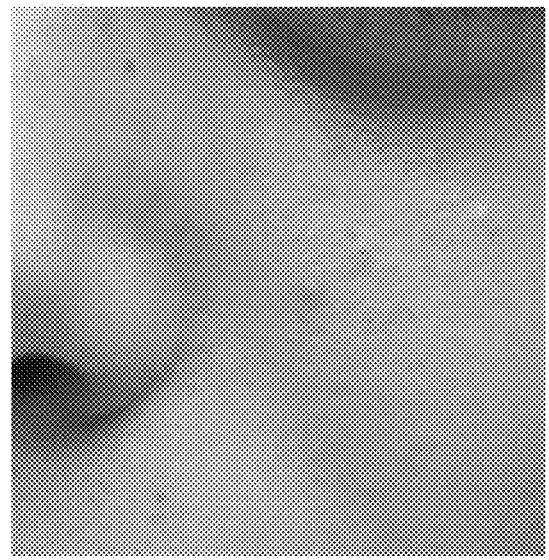
FIGS. 12A-12D show several example results of a blemish removal operation, in accordance with an embodiment of the present disclosure.
Figure 12B:
Figure 12C:
Figure 12D:
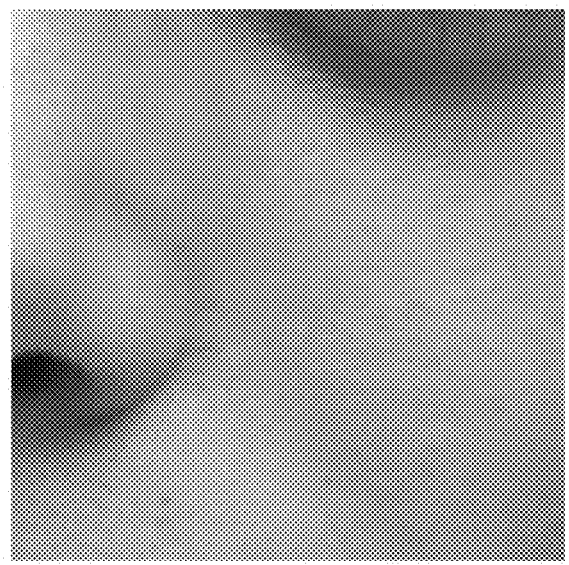

FIGS. 12A-12D show several example results of a blemish removal operation, in accordance with an embodiment of the present disclosure. FIG. 12A is a source image containing a blemish. FIG. 12B shows a standard pixel mask over a user-selected region of the source image that includes the blemish. Note that the standard pixel mask is uniformly white, which represents high opacity. Black regions represent high transparency. Further note that an extended pixel mask, which is adjacent to the standard pixel mask, exists but is not visible to the user. FIG. 12C shows a minimal output pixel mask, which has the same bounds as the standard pixel mask but has varying levels of opacity/transparency, as evidenced by the range in grayscale between black and white. In the example of FIG. 12C, the color threshold is relatively high (e.g., 80%), which causes a relatively large portion of the minimal output pixel mask to remain opaque. FIG. 12D is a destination, or output, image resulting from a blemish removal operation applied to the source image (FIG. 12A) using the minimal output pixel mask (FIG. 12C).

Example Computing Device

Figure 13:
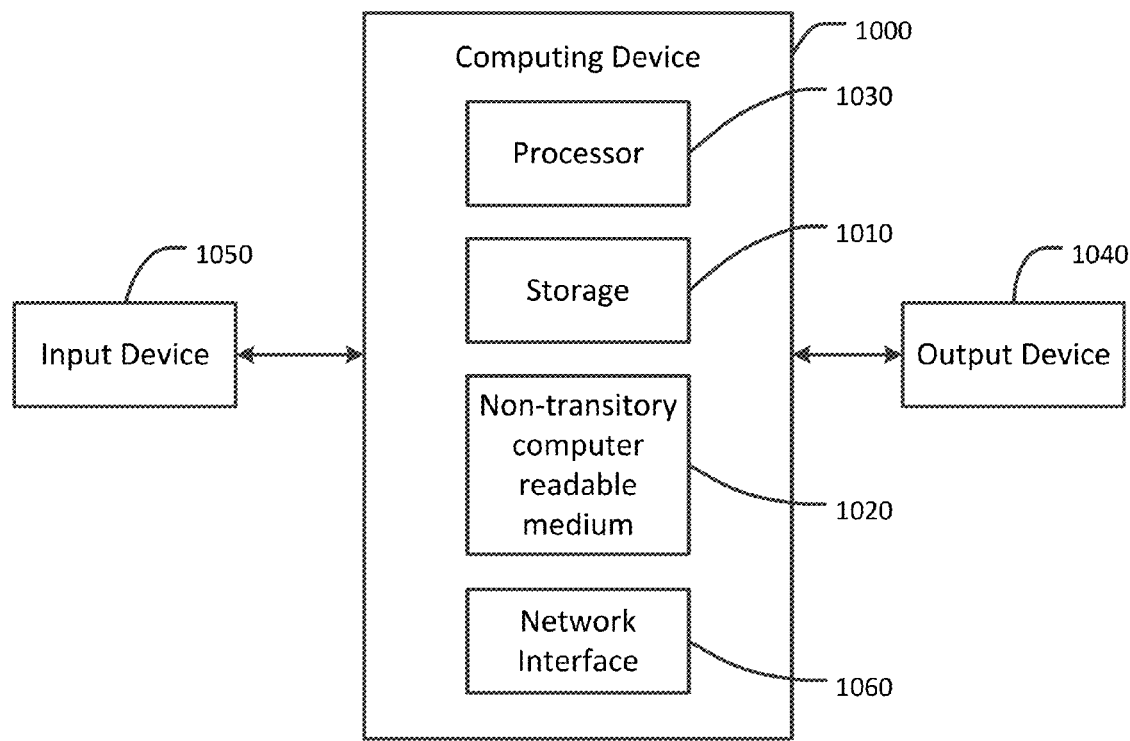
FIG. 13 is a block diagram representing an example computing device that may be used to perform any of the techniques as variously described in this disclosure.

FIG. 13 is a block diagram representing an example computing device 1000 that may be used to perform any of the techniques as variously described in this disclosure. For example, the system 100 of FIG. 1, or any portions thereof, and the methodologies of FIGS. 4 and 5, or any portions thereof, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the aspects as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the digital image editing application 120, the blemish removal module 122, the graphical user interface 124, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a system for digital image blemish removal in a digital medium environment for editing images, where the system includes a storage and a processor operatively coupled to the storage. The processor is configured to execute instructions stored in the storage that when executed cause the processor to carry out a process. The process includes receiving an input representing a selection of a plurality of pixels in a digital source image, where each of the pixels has a color associated with the respective pixel, and generating a standard pixel mask having a first plurality of opacity values corresponding to the selected pixels, an extended pixel mask having a second plurality of opacity values corresponding to pixels other than the selected pixels, and a minimal output pixel mask having a third plurality of opacity values corresponding to the selected pixels. The third plurality of opacity values is based on the first and second opacity values and on the colors of the pixels under the standard and extended pixel masks. The process further includes applying a blemish removal operation to the selected pixels based on the third plurality of opacity values in the output pixel mask. In some cases, the blemish removal operation includes a patch-based image synthesis (e.g., a content aware fill) operation that is performed on opaque and partially transparent pixels in the minimal output pixel mask, where the minimal output pixel mask has more transparent pixels than the standard pixel mask. In some cases, the process includes clustering the colors of pixels in the extended pixel mask and calculating a weighted number of colors in each cluster, where each cluster has a representative color. In some such cases, the weight for a given pixel in the extended pixel mask is proportional to an amount of transparency in the extended pixel mask for transparent pixels and is a constant proportional to a ratio of an area of the standard pixel mask to a total area covered by fully opaque pixels. In some other such cases, each of the third plurality of opacity values is a function of the weighted number of colors of a corresponding cluster, where a given one of the third plurality of opacity values is fully transparent above a threshold number of colors and has reducing transparency as the number of colors decreases below the threshold. In some cases, the second plurality of opacity values is greater than the corresponding first plurality of opacity values for semi-opaque pixels and the same for opaque pixels and decreases as a function of a distance from a center of the standard pixel mask and a given pixel under the extended pixel mask. In some cases, each of the third plurality of opacity values is less than or equal to a corresponding one of the first plurality of opacity values. In some cases, the process includes displaying indicia of the standard pixel mask in a graphical user interface and via a display device, where no indicia of the extended pixel mask are displayed. In some cases, each of the first, second and third opacity values range from 0.0 to 1.0 inclusive, where 0.0 represents fully transparent and 1.0 represents fully opaque.

Another example embodiment provides a computer-implemented method. The method includes receiving an input representing a selection of a plurality of pixels in a digital source image, where each of the pixels has a color associated with the respective pixel, and generating a standard pixel mask having a first plurality of opacity values corresponding to the selected pixels, an extended pixel mask having a second plurality of opacity values corresponding to pixels other than the selected pixels, and a minimal output pixel mask having a third plurality of opacity values corresponding to the selected pixels. The third plurality of opacity values is based on the first and second opacity values and on the colors of the pixels under the standard and extended pixel masks. The method further includes applying a blemish removal operation to the selected pixels based on the third plurality of opacity values in the output pixel mask. In some cases, the blemish removal operation includes a patch-based image synthesis (e.g., a content aware fill) operation that is performed on opaque and partially transparent pixels in the minimal output pixel mask, where the minimal output pixel mask has more transparent pixels than the standard pixel mask. In some cases, the method includes clustering the colors of pixels in the extended pixel mask and calculating a weighted number of colors in each cluster, where each cluster has a representative color. In some such cases, the weight for a given pixel in the extended pixel mask is proportional to an amount of transparency in the extended pixel mask for transparent pixels and is a constant proportional to a ratio of an area of the standard pixel mask to a total area covered by fully opaque pixels. In some other such cases, each of the third plurality of opacity values is a function of the weighted number of colors of a corresponding cluster, where a given one of the third plurality of opacity values is fully transparent above a threshold number of colors and has reducing transparency as the number of colors decreases below the threshold. In some cases, the second plurality of opacity values is greater than the corresponding first plurality of opacity values for semi-opaque pixels and the same for opaque pixels and decreases as a function of a distance from a center of the standard pixel mask and a given pixel under the extended pixel mask. In some cases, each of the third plurality of opacity values is less than or equal to a corresponding one of the first plurality of opacity values. In some cases, the method includes displaying indicia of the standard pixel mask in a graphical user interface and via a display device, where no indicia of the extended pixel mask are displayed. In some cases, each of the first, second and third opacity values range from 0.0 to 1.0 inclusive, where 0.0 represents fully transparent and 1.0 represents fully opaque. Another example embodiment provides a non-transient computer program product having instructions encoded thereon that when executed by one or more processors cause a process to be carried out for performing one or more of the aspects variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving, by a computing device, an input representing a selection of a plurality of pixels in a digital source image, each of the plurality of pixels having a color associated therewith;
   generating, by the computing device, a pixel mask having a first plurality of partially opaque pixels corresponding to at least a portion of the selected pixels;
   clustering the colors of pixels in an extended pixel mask having a second plurality of partially opaque pixels corresponding to pixels other than the selected pixels, and calculating a weighted number of colors in each cluster, wherein each cluster has a representative color;
   modifying, by the computing device, the pixel mask by increasing a transparency of the partially opaque pixels based at least in part on the weighted number of colors of the pixels in a region of the digital source image adjacent to the pixel mask; and
   applying, by the computing device, a blemish removal operation to the selected pixels using the modified pixel mask.

2. The method of claim 1, wherein the blemish removal operation includes a patch-based image synthesis operation that is performed on opaque and partially transparent pixels in the modified pixel mask, and wherein the modified pixel mask has more transparent pixels than the pixel mask.

3. The method of claim 1, wherein the weight for a given pixel in the extended pixel mask is proportional to an amount of transparency in the extended pixel mask for transparent pixels and is a constant proportional to a ratio of an area of the pixel mask to a total area covered by fully opaque pixels.

4. The method of claim 1, wherein an opacity of each pixel in the modified pixel mask is a function of the weighted number of colors of a corresponding cluster, and wherein a given pixel in the modified pixel mask is fully transparent above a threshold number of colors and having reducing transparency as the number of colors decreases below the threshold.

5. The method of claim 1, wherein an opacity of each pixel in an extended pixel mask having the second plurality of partially opaque pixels corresponding to pixels other than the selected pixels is greater than an opacity of the corresponding pixel in the pixel mask for semi-opaque pixels and the same for opaque pixels and decreases as a function of a distance from a center of the pixel mask and a given pixel under the extended pixel mask.

6. The method of claim 1, wherein an opacity of each pixel in the modified pixel mask is less than or equal to a corresponding pixel in the pixel mask.

7. The method of claim 1, further comprising displaying indicia of the pixel mask in a graphical user interface and via a display device, wherein no indicia of an extended pixel mask having the second plurality of partially opaque pixels corresponding to pixels other than the selected pixels are displayed.

8. The method of claim 1, wherein an opacity of each pixel in the digital source image is a value ranging from 0.0 to 1.0 inclusive, wherein 0.0 represents fully transparent and 1.0 represents fully opaque.

9. A computer-implemented method comprising:
receiving, by a computing device, a digital source image having a plurality of pixels, each of the plurality of pixels having a color associated therewith;
generating, by the computing device, a pixel mask having a first plurality of partially opaque pixels corresponding to target pixels containing blemishes within a first region of the digital source image;
clustering the colors of pixels in an extended pixel mask having a second plurality of partially opaque pixels corresponding to pixels other than the pixels in the first region of the digital source image, and calculating a weighted number of colors in each cluster, wherein each cluster has a representative color;
modifying, by the computing device, the pixel mask by increasing a transparency of the partially opaque pixels based at least in part on the weighted number of colors of the pixels in a second region of the digital source image adjacent to the pixel mask; and
applying, by the computing device, a blemish removal operation to the target pixels using the partially opaque pixels in the modified pixel mask.

10. The method of claim 9, wherein the blemish removal operation includes a patch-based image synthesis operation that is performed on opaque and partially transparent pixels in the pixel mask.

11. The method of claim 9, wherein the weight for a given pixel in the second region of the digital source image adjacent to the pixel mask is proportional to an amount of transparency in the second region of the digital source image adjacent to the pixel mask for transparent pixels and is a constant proportional to a ratio of an area of the pixel mask to a total area covered by fully opaque pixels.

12. The method of claim 9, wherein an opacity of each pixel in the pixel mask is a function of the weighted number of colors of a corresponding cluster, and wherein a given pixel in the pixel mask is fully transparent above a threshold number of colors and having reducing transparency as the number of colors decreases below the threshold.

13. The method of claim 9, wherein an opacity of each pixel in the second region of the digital source image adjacent to the pixel mask is greater than an opacity of the corresponding pixel in the pixel mask for semi-opaque pixels and the same for opaque pixels and decreases as a function of a distance from a center of the pixel mask and a given pixel under the second region of the digital source image adjacent to the pixel mask.

14. A computer-implemented method comprising:
receiving, by a computing device, a digital source image having a plurality of pixels, each of the plurality of pixels having a color associated therewith;
a step for detecting, by the computing device, target pixels containing blemishes within a user-selected region of the digital source image, the step for detecting target pixels including clustering the colors of pixels of partially opaque pixels corresponding to pixels other than the selected pixels, and calculating a weighted number of colors in each cluster, wherein each cluster has a representative color; and
a step for removing, by the computing device, the blemishes in the target pixels using the weighted number of colors of other pixels adjacent to the user-selected region of the digital source image.

15. The method of claim 14, wherein the step for removing the blemishes includes a patch-based image synthesis operation that is performed on opaque and partially transparent pixels in the user-selected region of the digital source image.

16. The method of claim 14, wherein the weight for a given pixel in the region of the digital source image adjacent to the user-selected region of a digital source image is proportional to an amount of transparency in the region of the digital source image adjacent to the user-selected region of a digital source image for transparent pixels and is a constant proportional to a ratio of an area of the user-selected region of a digital source image to a total area covered by fully opaque pixels.

17. The method of claim 14, wherein an opacity of each pixel in a region of the digital source image adjacent to the user-selected region of a digital source image is greater than an opacity of the corresponding pixel in the user-selected region of a digital source image for semi-opaque pixels and the same for opaque pixels and decreases as a function of a distance from a center of the user-selected region of a digital source image and a given pixel under the region of the digital source image adjacent to the pixel mask.

* * * * *